United States Patent [19]
Onozawa

[11] Patent Number: 5,542,050
[45] Date of Patent: Jul. 30, 1996

[54] FONT INFORMATION TRANSFER SYSTEM

[75] Inventor: Yuji Onozawa, Kanagawa, Japan

[73] Assignee: Fuji Xerox Co., Ltd., Tokyo, Japan

[21] Appl. No.: 369,580

[22] Filed: Jan. 6, 1995

Related U.S. Application Data

[63] Continuation of Ser. No. 77,716, Jun. 17, 1993, abandoned, which is a continuation of Ser. No. 763,588, Sep. 23, 1991, abandoned.

[30] Foreign Application Priority Data

Sep. 28, 1990 [JP] Japan ................... 2-257424

[51] Int. Cl.$^6$ ................................. G06K 15/00
[52] U.S. Cl. ........................... 395/110; 395/114
[58] Field of Search .................. 395/101, 110, 395/114, 151, 150, 115–116; 358/400, 470; 400/61–63, 70–72; 345/25, 26, 127, 128, 129, 130, 143, 140

[56] References Cited

U.S. PATENT DOCUMENTS

| 4,754,428 | 6/1988 | Schultz et al. | 395/275 |
| 4,907,282 | 3/1990 | Daly et al. | 395/150 |
| 4,939,670 | 7/1990 | Freiman et al. | 395/114 |
| 5,025,398 | 6/1991 | Nelson | 395/114 |
| 5,046,027 | 9/1991 | Taaffe et al. | 395/153 |
| 5,220,674 | 6/1993 | Morgan et al. | 395/110 |

FOREIGN PATENT DOCUMENTS 63-196986  8/1988  Japan.

*Primary Examiner*—Arthur G. Evans
*Attorney, Agent, or Firm*—Finnegan, Henderson, Farabow, Garrett & Dunner, L.L.P.

[57] ABSTRACT

A font information transfer system in a network system including a network, a workstation, and a printer connected to the workstation through the network. In the font information transfer system, the workstation includes a font information generation section for generating information for generating a font, and the printer includes a font generation section for generating the font on the basis of the font information transferred from the workstation.

16 Claims, 8 Drawing Sheets

ATTRIBUTE "1"

CONTROL THE HEIGHT BY THE VALUE OF r

FONT INFORMATION TRANSFER SYSTEM

This application is a continuation, of application Ser. No. 08/077,716, filed Jun. 17, 1993 now abandoned; which is a continuation of application Ser. No. 07/763,588, filed Sep. 23, 1991, now abandoned.

BACKGROUND OF THE INVENTION

The present invention relates to a font information transfer system in a network system constituted by workstations connected through a network and a printer for executing a print job transferred from the workstations, and particularly relates to a font information transfer system for transferring font information to a printer for generating characters with a font in which the line width of strokes is changed from outline data of characters (character frame data: data to approximate outlines of characters to straight or curved lines: basic font data) supplied from a workstation, or a font in which outline shapes of characters are modified in each portion thereof, and for executing a print job of a document including characters with such a font.

Recently, as seen in a DTP (desk top publishing) system, an apparatus has been developed in which a document is made up and edited in a workstation and the made-up document is transferred to a printer so as to be printed with picture quality equivalent to type-printing.

In addition, characters with various fonts used in typography such as type-printing can be used in a workstation.

With such developments, it is expected that requests for printing special fonts made up by individual users will be more numerous.

In order to satisfy such requests, there has been proposed a technique for generating various fonts by making basic font data, that is, standard font data subject to a procedure for modifying font frames or for changing writing shapes (outlines) tracing on the font frames.

In such apparatus, in order to make various characters usable, the above-mentioned outline font to approximate and compress outlines of characters with straight and curved lines (straight/curved lines) is used as a font to freely change the sizes of characters.

Such a conventional technique is disclosed, for example, in Japanese Patent Unexamined Publication No. Sho. 63-196986.

In the conventional system, an outline font is obtained by calculating approximated straight/curved lines on the basis of coordinates called control points so that transformation processing, for example, such as known "affine transformation" to perform the same transformation upon all coordinates can be performed comparatively easily while keeping high quality of characters. There has been, however, a problem that modification to change stroke width (picture width of Chinese character and so on) or transform outline shape in each portion cannot be executed with high quality.

In addition, if a font generated in a workstation by a user individually is supplied to a printer in the above-mentioned conventional system, documents to be transferred are converted into image data one by one before they are transferred to the printer.

Therefore, the quantity of data to be transferred to the printer becomes large, so that there has been a problem that it takes a long time to print out the data, or that a font made up once cannot be used again, resulting in reduction in operation efficiency of a network as a whole.

In addition, although it can be considered that such fonts are all held as font data, the number of developing processes therefor will be extremely large, and if all the fonts can be developed, it will be almost impossible to make sure of the capacity of a memory for storing all the data.

SUMMARY OF THE INVENTION

It is therefore an object of the present invention to solve the foregoing problems in the conventional system.

It is another object of the present invention to provide a font information transfer system in which the picture quality of characters after transformation can be prevented from deteriorating so as to make it possible to generate transformed characters (line-width/partial-shape transformation), that is, transformed fonts, with high picture quality, in which a made-up desired font can be transferred to a printer without converting the font into image data, and in which the made-up fonts can be used again.

In order to attain the foregoing objects, a font information transfer system in a network system according to the present invention comprises: a network; a workstation including font information generation means for generating information for generating a font; and a printer connected to the workstation through the network, including font generation means for generating the font on the basis of the font information transferred from the workstation.

DETAILED DESCRIPTION OF THE PREFERRED EMBODIMENT

An embodiment of the present invention will be described with reference to the drawings.

Figure 1:
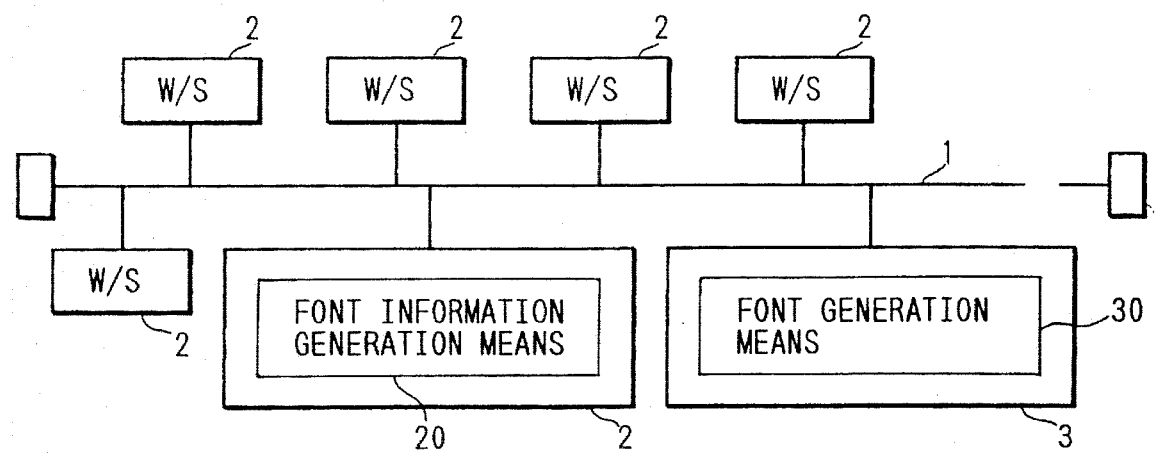
FIG. 1 is a block diagram for explaining the basic configuration of the font information transfer system according to the present invention.

FIG. 1 is a block diagram for explaining the basic configuration of the font information transfer system according to the present invention. In FIG. 1, the reference numeral 1 represents a network, 2, 2, 2 . . . represent workstations, and 3 represents a printer.

Each of the workstations 2 includes a font information generation means 20 for generating information for generating a font, and the printer 3 includes a font generation means 30 for generating a font on the basis of the font information transferred from the workstation 2.

The font information generation means 20 provided in each workstation 2 has a function to generate various font information by giving various generating procedures to basic font data of characters, that is, basic font data of characters the outlines of which are approximated to straight/curved lines.

On the other hand, the font generation means 30 provided in the printer 3 generates and prints a predetermined font in response to the font information (basic font data, procedure data, and attestation data) transferred from the workstation 2.

The font generation means 30 has a font registration means for registering procedure data and attestation data therefor which are transferred from the workstation 2 and which constitute font data, so that a font which has been registered once can be generated by transferring only attestation data from the workstation 2.

The generation of a font performed in the workstation 2 by a user will be described with reference to FIGS. 2 to 10(*b*).

Figure 2:
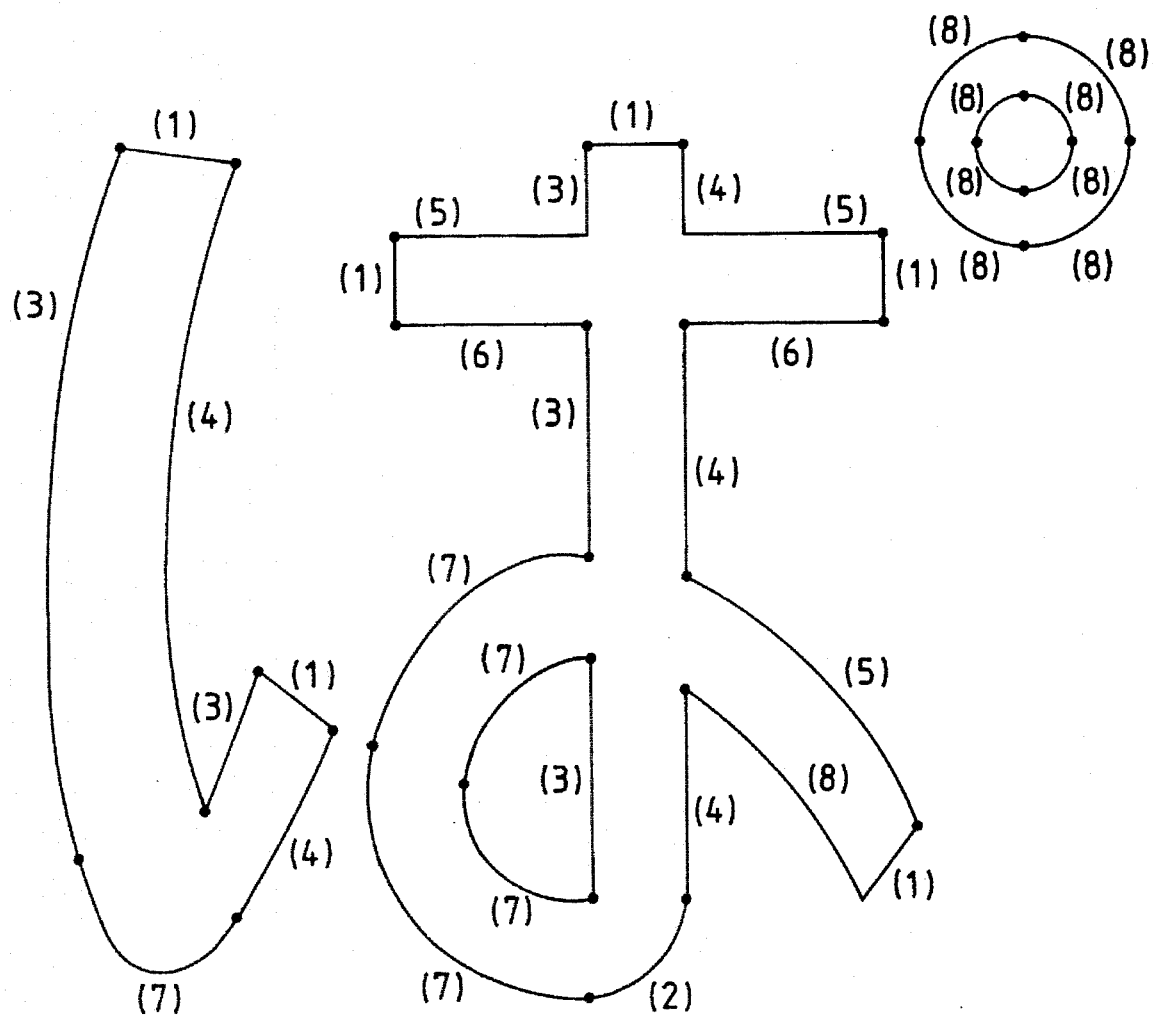
FIG. 2 is a diagram for explaining attributes of a character as basic font data.

FIG. 2 is a diagram for explaining attributes of a character as basic font data. Here, as shown in FIG. 2, for example, the data in which the outline of a square-gothic character (Japanese hiragana) is approximated by straight lines and Bezier curved lines is transformed into a font of round-gothic character by controlling line width and modifying stroke edges by use of procedure data in which an attribute described later is added to each segment.

"Additional attributes" to be added here means that common parts having the same outline characteristic in respective segments constituting a character are grouped in a concept as follows.

"Additional Attributes"

1: The outline of a stroke edge

2: The outline having both characteristics of longitudinal and transversal strokes 3: The outline of a left side of a longitudinal stroke 4: The outline of a right side of a longitudinal stroke 5: The outline of an upper side of a transversal stroke 6: The outline of a lower side of a transversal stroke 7: The outline of a curved stroke (stroke having a large curvature)

8: The outline of a circle

The above-mentioned attribute "1" means the outlines referenced by (1) in FIG. 2, which are six in the square-gothic character .

The attribute "2" means the two outlines referenced by (2) in the same manner, the attribute "3" means the five outlines referenced by (3), the attribute "4" means the five outlines referenced by (4), the attribute "5" means the three outlines referenced by (5), the attribute "6" means the two outlines referenced by (6), the attribute "7" means the four outlines referenced by (7), and the attribute "8" means the eight outlines referenced by (8).

Figure 3:
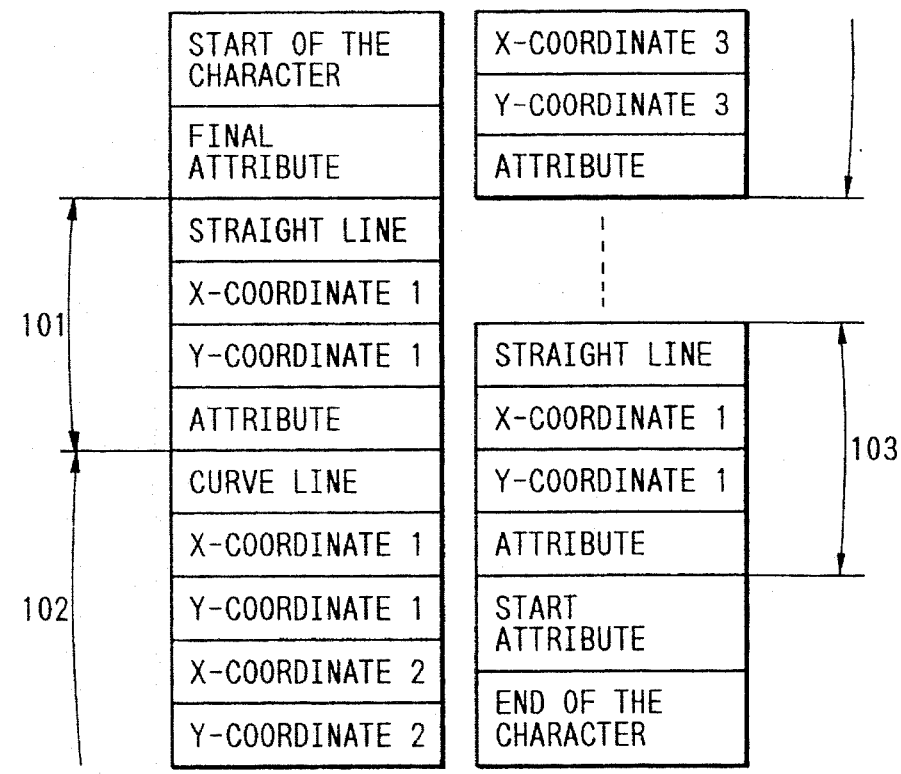
FIG. 3 is a diagram for explaining basic font data of the character stored in the basic font data memory.

FIG. 3 is a diagram for explaining basic font data of the character stored in a basic font data memory, which will be described later. As shown in FIG. 3, font data of a character given the attributes "1" to "8" as described in FIG. 2 is stored in the shape of respective segments of the character separated by the attributes as shown by the segments 101, 102, . . . , 103 in FIG. 3. Further, start coordinates of each segment are corresponding to end coordinates of the previous segment.

Figure 4:
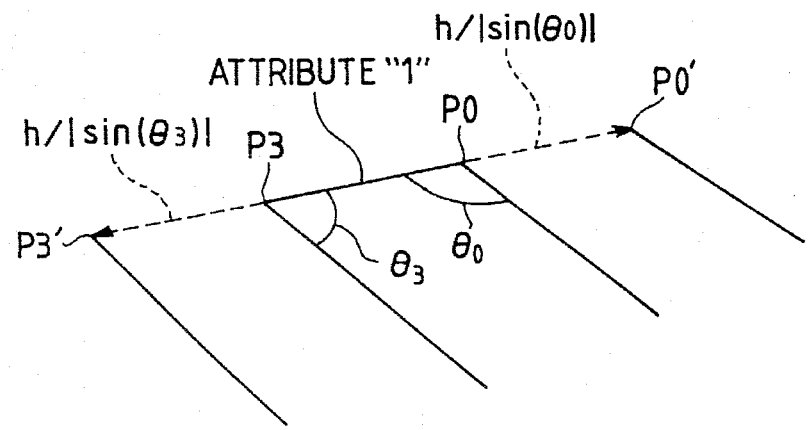
FIGS. 4 to 10(b) are diagrams for explaining font generation processing on the basis of basic font data and procedure data instructed by a user.

FIGS. 4 to 10(*b*) are diagrams for explaining font generation processing on the basis of basic font data and font generation procedure data (modified parameters) instructed by a user. FIG. 4 explains a boldface processing of the attribute "1", FIG. 5 explains a boldface processing of the attribute "2", FIG. 6 explains a boldface processing of the attributes "3" to "7", FIG. 7 explains a boldface processing of the attribute "8", FIGS. 8(*a*) and 8(*b*) explain a round processing of the attribute "1", FIGS. 9(*a*) and 9(*b*) explain a round processing of a corner, and FIGS. 10(*a*) and 10(*b*) explain a boldface/round processing.

The font generation processing will be described in the order from FIG. 4 to FIG. 10(*b*).

(A) The case where a processed segment has the attribute "1" (with reference to FIG. 4)

No matter which attribute the next or previous segment has, both the start and end points (P0, P3) of the processed segment are moved on the segment (including its extension) by $h/|\sin\theta|$ dots to the points (P0', P3').

In the case of slenderizing, the points are moved onto the segment, and in the case of boldfacing, the points are moved onto the extension of the segment (FIG. 4 shows a boldface processing).

Then the angle $\theta$ ($\theta_0$, $\theta_3$) means an angle of the intersection of adjacent segments at start and end points.

Figure 5:
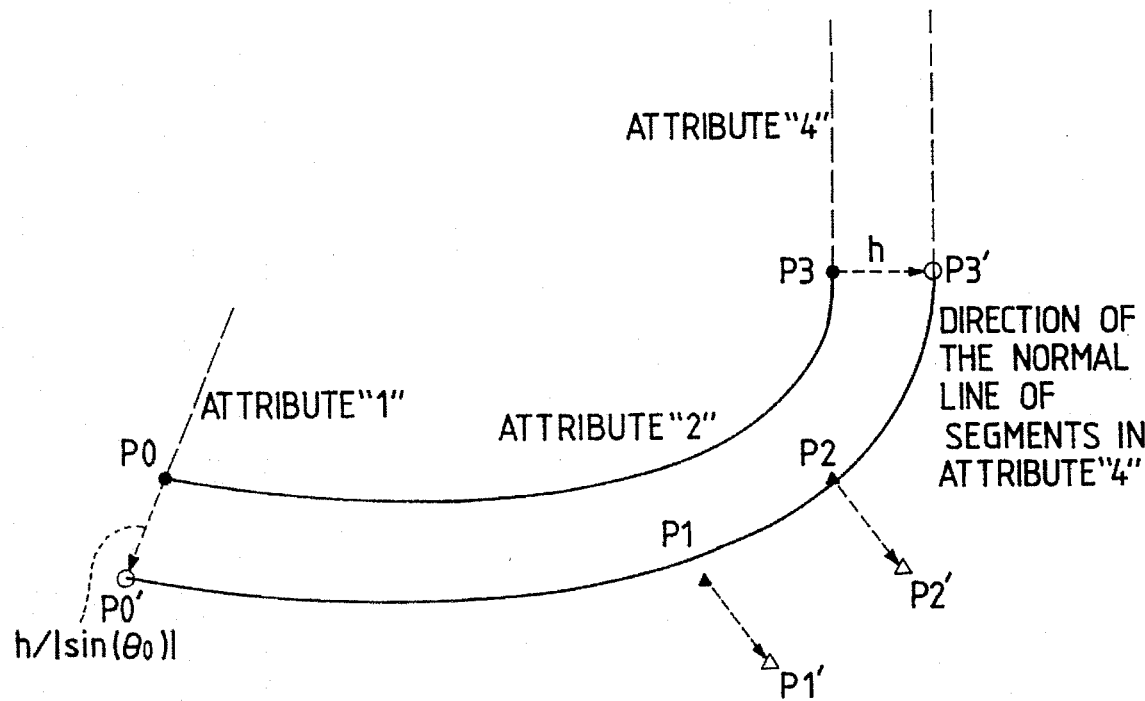

(B) The case where a processed segment has the attribute "2" (with reference to FIG. 5)

If segments connected to the start and end points of the processed segment has an attribute other than "1" (the attribute "4" in FIG. 5), the processed segment is moved in the direction of the normal line of those connected segments by h dots (P1→P1', P2→P2' and P3→P3').

In the case of slenderizing, the segment is moved in the direction opposite to the above-mentioned normal line.

The movement of P0→P0' is performed in the same manner as the above-mentioned processing (A).

Figure 6:
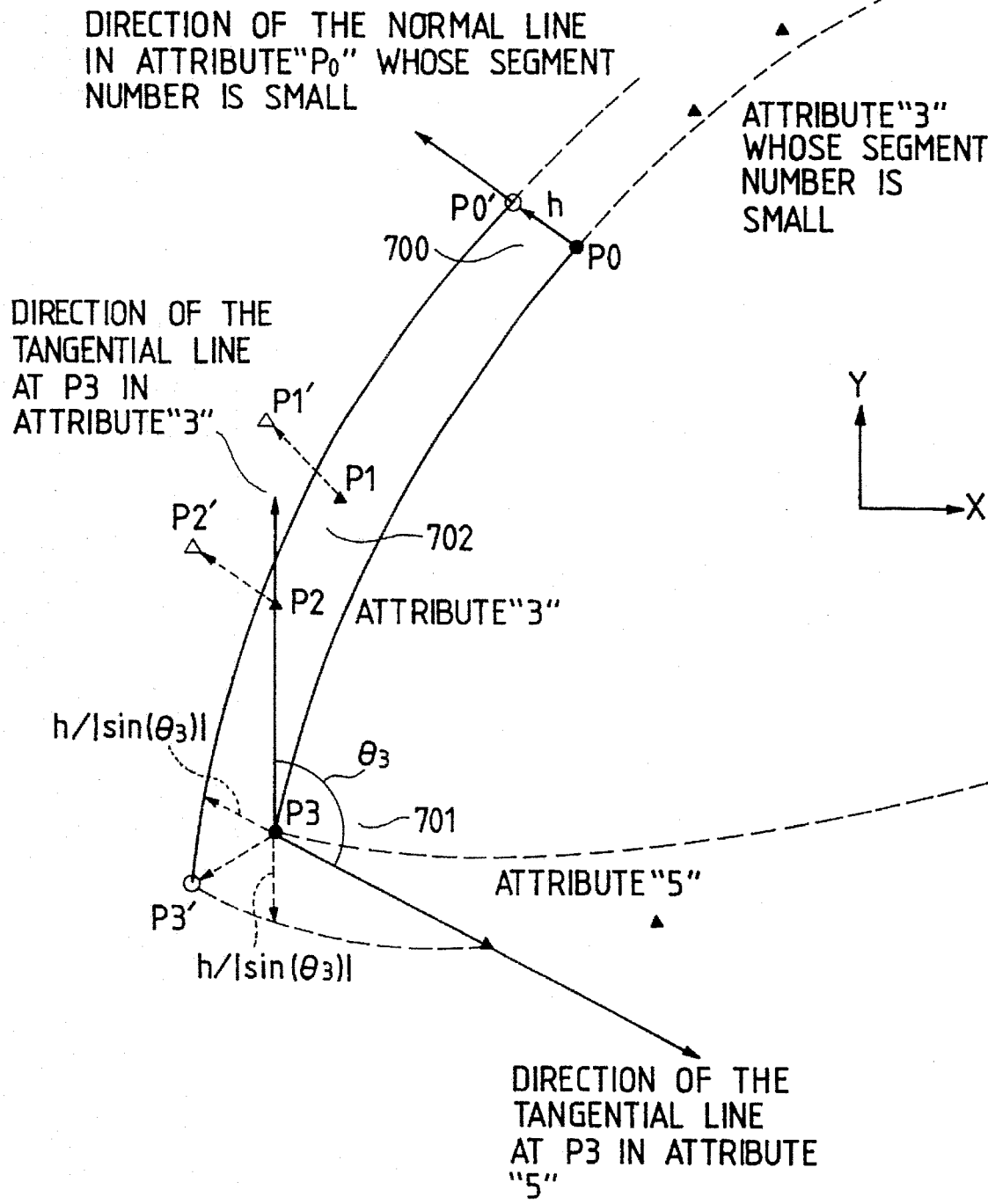

(C) The case where a processed segment has the attribute "3" to "7" (with reference to FIG. 6)

If both segments connected to the start and end points of the processed segment have the attribute "2" or the same as that of the processed segment (in FIG. 6, the latter, that is, the connected segment has the same attribute "3") as shown by a segment 700 in FIG. 6, the processed segment is moved in the direction of the normal line of the segment by h dots (P0→P0').

If both segments connected to the start and end points of the processed segment have other attributes, the processed segment is moved on the segment (including its extension) by $h/|\sin\theta|$ dots, and further in the direction of the connected segment by $h/|\sin\theta|$ dots (P3→P3').

The direction of slenderizing/boldfacing depends on the attribute of a segment. For example, at the point P3, as shown by a segment 701, if the attribute of the processed segment is "3" and the attribute of the connected segment is "5", in the case of boldfacing, first the processed segment is moved on the segment in the direction to increase its Y-distance, and further moved on the connected segment in the direction to decrease its X-distance (P1→P1', and P2→P2').

Then the angle $\theta$ ($\theta_3$) means an angle of the intersection of adjacent segments at start and end points.

Figure 7:
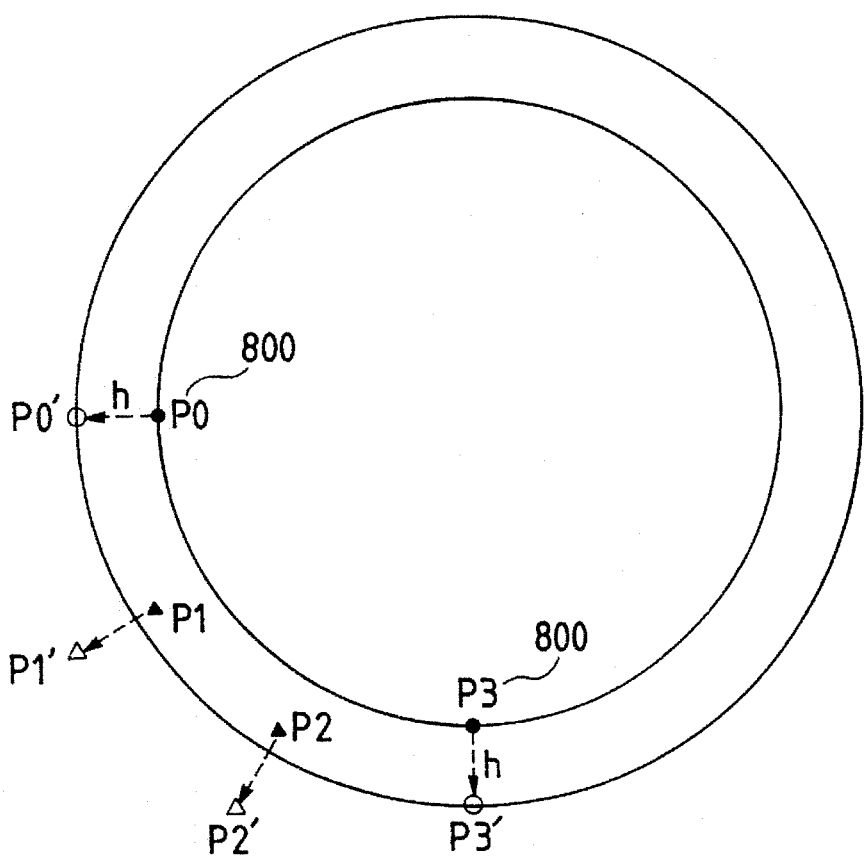

(D) The case where a processed segment has the attribute "8" (with reference to FIG. 7)

Both the start and end points of the processed segment are moved in the direction of the normal line of the segment by h dots (P0→P0', and P3→P3').

(E) The movement of control points in the case of a Bezier curve (in the case of attributes other than the attribute "8")

As shown by a segment 702, assuming first and second control points of a Bezier curve are P1 and P2 respectively, the respective control points P1 and P2 are moved to points P1' and P2' (P1→P1', and P2→P2') by:
(the quantity of movement of the first control point P1)
=⅔×(the quantity of movement of the start point)
+⅓×(the quantity of movement of the end point)
(the quantity of movement of the second control point P2)
=⅓×(the quantity of movement of the start point)
+⅔×(the quantity of movement of the end point)

(F) The movement of control points in the case of the attribute "8" (with reference to FIG. 7)

In this case, the attributes of connected segments are the same attribute "8", that is, the outline of a circle, so that as shown by a segment 800 in FIG. 7, both the start and end points are moved in the direction of the normal line by h dots (P0→P0', and P3→P3'), and respective control points P1 and P2 are moved, as shown in FIG. 7, to points P1' and P2' (P1→P1', and P2→P2') by:
(the quantity of movement of the first control point P1)
=(the quantity of movement of the start point)
$^{11}/_{20}$×(the quantity of movement of the end point)
(the quantity of movement of the second control point P2)
=$^{11}/_{20}$×(the quantity of movement of the start point)
+(the quantity of movement of the end point)

If a slenderizing/boldfacing processing is finished in the above manner, it is confirmed whether a registered segment is kept in its horizontality/verticality after being transformed, and if not kept, to prevent the picture quality from being deteriorated extremely, the segment is moved by use of the average of respective coordinate values, so as to keep the horizontality/verticality.

After that, correspondingly to an instructed attribute, a round processing is performed as follows.

Figure 8A:
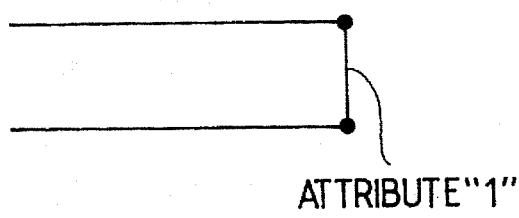
Figure 8B:
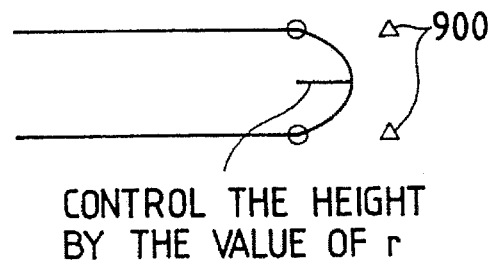

(G) A segment of the attribute "1" (with reference to FIG. 8)

Correspondingly to a round control parameter (curvature r of a round curve), that is, by controlling the curvature of a line connecting the start point with the end point by the value of the curvature r, coordinate points are moved so as to make the segment have a curve.

FIGS. 8(*a*) and 8(*b*) show the shapes of a segment having the attribute "1" before and after a round processing respectively. If the processed segment is a straight line segment, it is made a Bezier segment and given a round processing, by setting control points 900 of a Bezier curve.

Figure 9A:
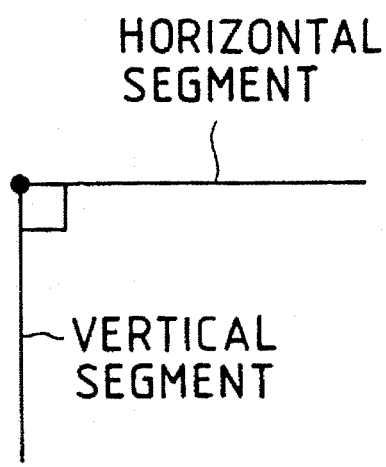
Figure 9B:
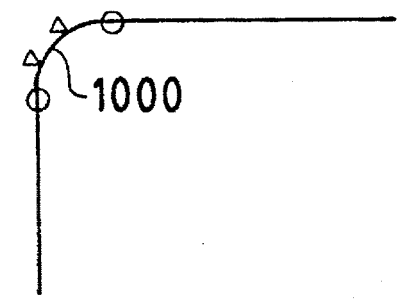

(H) The intersection of horizontal and vertical segments (with reference to FIG. 9)

As shown in FIG. 9(*a*), in the intersection of horizontal and vertical segments, a new segment 1000 is inserted as shown in FIG. 9(*b*), and the corner is rounded correspondingly to a round control parameter in the above manner.

After that, the following coordinate transformation is performed with affine coefficients a, b, c and d by affine transformation.

$$X'=a \times X + b \times Y$$

$$Y'=c \times X + d \times Y$$

Figure 10A:
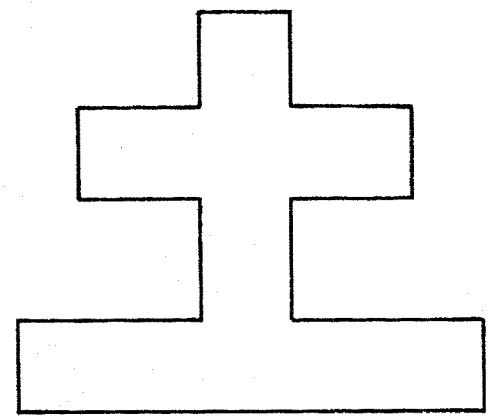
Figure 10B:
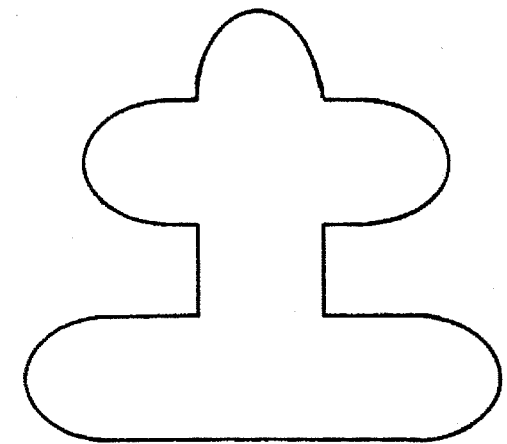

Since the movement of coordinates has been finished, an outline is then drawn in an image memory from values of the coordinates by outline approximation, the interior is painted, and the generation of a character given line-width adjustment/round processing is completed (FIGS. 10(*a*) and 10(*b*) show an example of stroke ends before and after processing respectively).

Although an example of rounding the shape of stroke ends has been described in the above embodiment on the assumption that the modification of a font is a round transformation, the present invention is not limited to the above-mentioned round transformation, but can be applied to sharpening a stroke end, or waving a character.

In the above embodiment, although a generated font is developed on an image memory to thereby generate a real character in order to display the generated font on a window of a workstation, the present invention is characterized in that the generated font is transferred to a printer connected through a network and printed therein.

According to the present invention, therefore, basic font data, font generation procedure data such as above-mentioned attribute data and parameters, affine coefficients and so on, attestation data as a name code proper to a font to be generated are transferred as font data to a printer connected through a network.

Next, an embodiment of the present invention to transmit font data made up in the above manner to a printer will be described.

Figure 11:
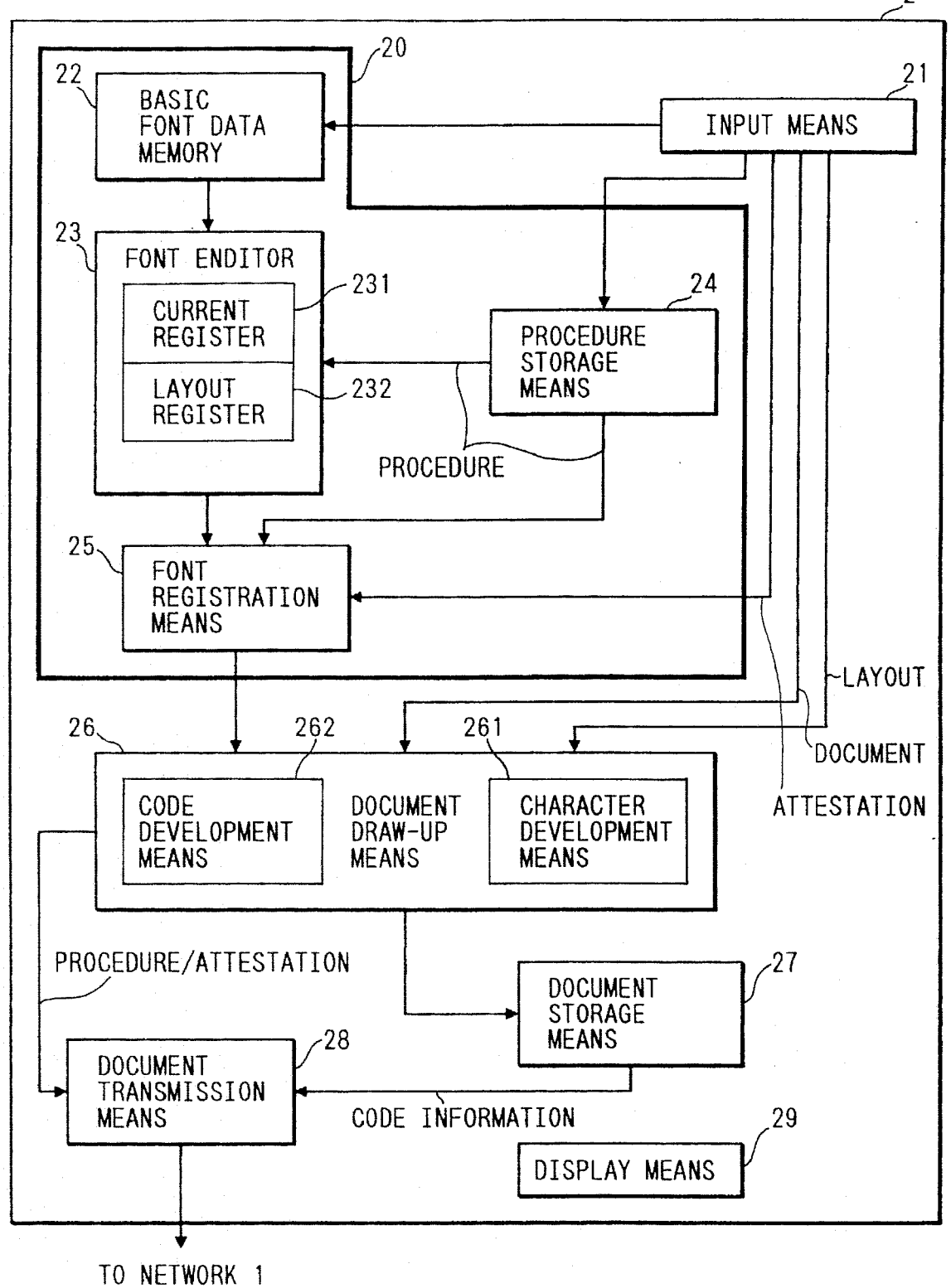
FIG. 11 is a block diagram for explaining the configuration of the workstation in the font information transfer system according to the present invention.

FIG. 11 is a block diagram for explaining the configuration of the workstation in the font data transfer system according to the present invention. In FIG. 11, the reference numeral 2 represents a workstation, 20 represents a font information generation means, 21 represents an input means (such as a keyboard) operated by a user, 22 represents a basic font data memory, 23 represents a font editor, 231 represents a current register, 232 represents a layout register, 24 represents a procedure storage means, 25 represents a font registration means, 26 represents a document draw-up means, 261 represents a character development means, 262 represents a code development means, 27 represents a document storage means, 28 represents a document transmission means, and 29 represents a display means (window).

Here the case of drawing up a document by only characters and transferring the document to a printer through a network will be described.

First in the case where a document to be drawn up is inputted from the input means 21 by use of a font which has been registered (the case of no font generation processing work which has been described with reference to FIGS. 2 to 10(*b*)), the attribute of a character is registered in the current register 231, and the start position of the character on the document is registered in the layout register 232.

The attribute registered in the current register 231 includes the size of the character, the inclination thereof, and the font number thereof.

If a character code is inputted, the font editor 23 obtains information about document development from the current register 231 and the layout register 232, obtains procedure to develop the font from the font registration means 25 corresponding to the font number, performs font generation processing according to this procedure on basic font data stored in the basic font data memory 22, and develops this data on the display means 29.

On the other hand, the code development means 262 of the document draw-up means 26 develops the attribute registered in the current register 231, the value registered in the layout register 232 and the character code on the document storage means 27.

Then the values registered in the current register 231 and the layout register 232 are changed if the font is switched to another or the layout is moved to a place in a manner other than simple increment, and only the changed portions are added to and written in the document storage means 27.

Next, the case where a new font other than fonts which have been registered is generated to input a document will be described.

First a code of an objective character to be newly generated newly and procedure data to generate its font are put through the input means 21.

The inputted procedure data is written in the procedure storage means 24 once.

Correspondingly to the inputted objective character code, basic font data of the character is extracted from the basic font data memory 22 and supplied to the font editor 23.

A font is generated for this basic font data by use of the procedure data written in the procedure storage means 24, and developed on the display means 29.

Confirming the character developed on the display means 29, by the font generation procedure which has been described with reference to FIGS. 2 to 10(b), a user corrects the procedure data stored in the procedure storage means 24, and registers a font generated finally into the font registration means 25.

At this registering time, a number, or attestation data constituted by a name is put from the input means 21 for this new font, and registered in the font registration means 25 together with the procedure stored in the procedure storage means 24.

After that, since the new font is a registered character, the document is drawn up by the same input and procedure as that of the above-mentioned characters which have been registered.

The drawn-up document is stored in the document storage means 27 and transferred to a printer by the document transmission means 28. The document transmission means 28 then judges whether there is a new font in the document to be transferred.

If there is no new font, the document transmission means 28 transmits only the character codes stored in the document storage means 27.

On the other hand, if there is a new font, the document transmission means 28 transmits not only the character codes stored in the document storage means 27 but also procedure data for generating the new font and attestation data thereof.

Figure 12:
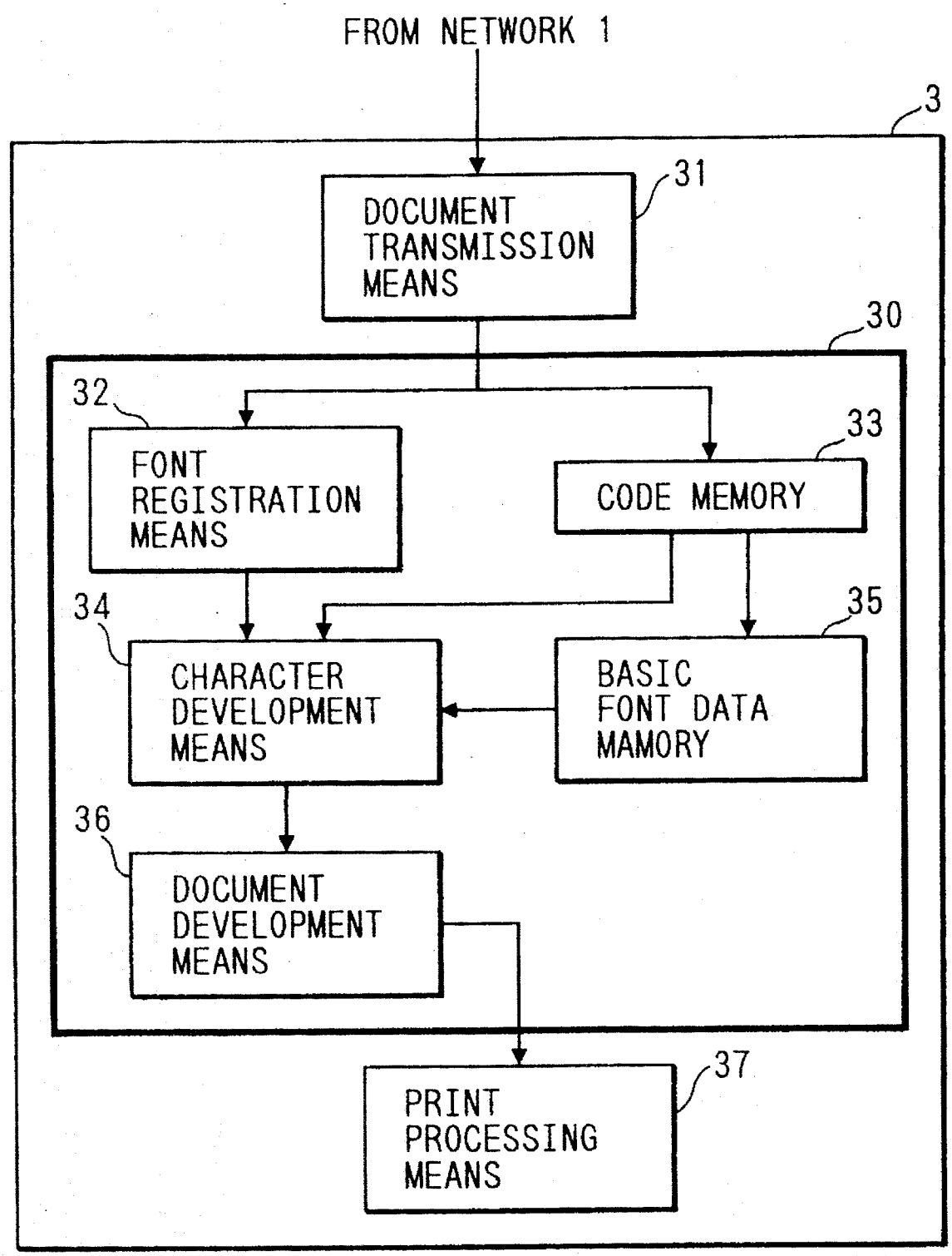
FIG. 12 is a diagram for explaining the configuration of the printer in the font information transfer system according to the invention.

FIG. 12 is a diagram illustrating the configuration of the printer. In FIG. 12, the reference numeral 30 represents a font generation means, 31 represents a document transmission means, 32 represents a font registration means, 33 represents a code memory, 34 represents a character development means, 35 represents a basic font data memory, 36 represents a document development means, and 37 represents a print processing means.

In FIG. 12, document data transferred from the workstation 2 through the network 1 is received by the document transmission means 31 of the printer 3.

The document transmission means 31 judges whether there is a new font data in the transferred document data, and if there is, the document transmission means 31 registers the new font data (procedure data and attestation data) in the font registration means 32, and stores other data (character code and layout information) in the code memory 33.

On the basis of the character code and the layout information stored in the code memory 33, the character development means 34 generates a font from basic font data stored in the basic font data memory 35 by use of procedure data for generating a font registered in advance or newly in the font registration means 32, and develops a document on the document development means 36.

The document developed on the document development means 36 is transferred to the print processing means 37 so as to be printed therein.

Since a basic font data memory and a font registration means for registering font generation procedure data and attestation data thereof are provided on the printer side, in the case of using the same font again, if only attestation data thereof is transferred from the workstation 2 to the printer 3, font generation procedure data instructed by the attestation data is extracted from the font registration means 32. Then, generation procedure is given to basic font data of an objective character from the basic font data memory 35, a font of the character is generated, and it is printed in the print processing means 37.

Thus, when a document generated on a workstation and a font of a desired character are transferred to a printer to be printed therein, only code data of the character, font generation procedure data thereof and attestation data thereof are transferred. In the case of a font which has been generated once, it is possible to execute a print processing if only attestation data thereof is transferred to the printer.

As has been described, according to the present invention, it is possible to generate a character having a modified stroke line width and a character having a font transformed per segment upon its outline shape on the basis of one and the same outline data, and it is not necessary to prepare various outline data, so that it is possible to reduce the capacity of a memory storing font data, and when a document generated on a workstation and a font of a desired character are transferred to a printer and printed, only code data of the character, font generation procedure data thereof and attestation data thereof need be transferred. Thus, it is not necessary to transmit the document after converting it to image data on the workstation side as in the conventional system.

In addition, it is possible to reuse a font which has been generated once if only attestation data thereof is transferred.

It is therefore possible to reduce the quantity of data transferred through a network, and it is also possible to shorten time required for printing.

What is claimed is:

1. A font information transfer system in a network system comprising:

a network;

a workstation connected to said network;

a printer connected to said network;

said workstation including first storage means for storing outline information provided for each character represented in a predetermined font, second storage means for storing one or more procedure data pieces each indicative of a procedure for modifying said outline information to represent said each character in a new font, said second storage means further storing font identifications identifying said procedure data pieces, transfer means for transferring to said printer through said network said procedure data pieces and said font identifications, and further transferring to said printer through said network data indicative of a character stream and said font identification corresponding to a selected font to be used to represent said character stream; and said printer having another storage means for storing said procedure data pieces and said font identifications identifying said procedure data pieces transferred from said workstation through said network, and having character image generating means for generating data indicative of said character stream represented in said selected font on the basis of said outline information and said procedure read out from said another storage means by said font identification corresponding to said selected font.

2. The font information transfer system according to claim 1, wherein said workstation further includes character image generating means for modifying said outline information in accordance with the font generation procedure data corresponding to said selected font and generating data indicative of one or more characters represented in said selected font, and further includes display means for displaying said one or more characters in said selected font in accordance with said data generated by said character image generating means.

3. The font information transfer system according to claim 1, wherein said font data includes attribute data indicating outline characteristics for respective segments constituting each character.

4. A font information transfer system comprising:

a network;

a workstation connected to the network, said workstation comprising first storage means for storing font generation procedure data indicating a procedure to be used to modify outline information for each character represented in a basic font so as to represent said each character in a new font, and transfer means for transferring the font generation procedure data stored in said first storage means onto said network; and an output unit connected to the network, said output unit comprising second storage means for storing said outline information for said each character represented in said basic font reading means for reading out said outline information from said second storage means, and character image generating means for modifying said outline information thus read out in accordance with the font generation procedure data transferred by said transferring means and generating data indicative of one or more characters represented in the new font in accordance with the outline information thus modified.

5. The font information transfer system according to claim 4, wherein said basic font data outline information includes curvature data, direction data and position data of edges for each of outline components into which an outline of each character is divided, and wherein said font generation procedure data can be corrected by a user.

6. The font information transfer system according to claim 4, wherein said workstation further includes character image generating means for modifying said outline information in accordance with the font generation procedure data corresponding to said selected font and generating data indicative of one or more characters represented in said selected font, and further includes display means for displaying said one or more characters in said selected font in accordance with said data generated by said character image generating means.

7. The font information transfer system according to claim 4, wherein said first storage means also stores font indication corresponding to said new font, and said transfer means transfers said font indication to said output unit through said network.

8. The font information transfer system according to claim 7, wherein said character image generating means generates said data indicative of said one or more characters in accordance with said font indication.

9. A workstation comprising:

first storage means for storing outline information for each character represented in a basic font;

second storage means for storing font generation procedure data indicating a procedure for modifying said outline information so as to represent said each character in a new font; and transfer means for transferring the generation procedure data stored in said second storage means to an output unit.

10. The workstation according to claim 9, wherein said basic font data outline information includes curvature data, direction data and position data of edges for each of outline components into which an outline of each character is divided, and wherein said font generation procedure data can be corrected by a user.

11. The workstation according to claim 9, wherein said workstation further includes character image generating means for modifying said outline information in accordance with the font generation procedure data corresponding to said selected font and generating data indicative of one or more characters represented in said selected font, and further comprising display means for displaying said one or more characters in said selected font in accordance with said data generated by said character image generating means.

12. The workstation according to claim 9, wherein said first storage means also stores font indication corresponding to said new font, and said transfer means transfers said font indication to said output unit through said network.

13. An output unit comprising:

receiving means for receiving document data transferred from a workstation, and font generation procedure data indicating a procedure for modifying outline information for each character represented in a basic font so as to represent said each character in a new font;

storage means for storing said outline information; and character image generating means for modifying said outline information read out from said storage means in accordance with the font generation procedure data received by said receiving means and generating data indicating one or more characters represented in the new font in accordance with the outline information thus modified.

14. The output unit according to claim 13, wherein said basic font data outline information includes curvature data, direction data and position data of edges for each of outline components into which an outline of each character is divided.

15. The output unit according to claim 13 wherein said document data includes font indication corresponding to said new font, and said character image generating means generates said data indicating said one or more characters in accordance with said font indication.

16. The font information transfer system according to claim 3, wherein each of said procedure data piece defining modifications is applied to one or more segments having a predetermined one of said outline characteristics.

* * * * *